US011232261B2

(12) United States Patent
Datla et al.

(10) Patent No.: US 11,232,261 B2
(45) Date of Patent: Jan. 25, 2022

(54) OPEN DOMAIN REAL-TIME QUESTION ANSWERING

(71) Applicant: KONINKLIJKE PHILIPS N.V., Eindhoven (NL)

(72) Inventors: Vivek Varma Datla, Ashland, MA (US); Tilak Raj Arora, Bangalore (IN); Junyi Liu, Windham, NH (US); Sheikh Sadid Al Hasan, Cambridge, MA (US); Oladimeji Feyisetan Farri, Yorktown Heights, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 181 days.

(21) Appl. No.: 16/430,788

(22) Filed: Jun. 4, 2019

(65) Prior Publication Data

US 2019/0377796 A1   Dec. 12, 2019

Related U.S. Application Data

(60) Provisional application No. 62/681,123, filed on Jun. 6, 2018.

(51) Int. Cl.
*G06F 40/30* (2020.01)
*G06F 16/9032* (2019.01)
(Continued)

(52) U.S. Cl.
CPC ........ *G06F 40/30* (2020.01); *G06F 16/90332* (2019.01); *G06F 40/289* (2020.01); *G06N 3/08* (2013.01); *G09B 7/00* (2013.01)

(58) Field of Classification Search
USPC .............................................. 704/7–10, 257
See application file for complete search history.

(56) References Cited

U.S. PATENT DOCUMENTS 10,885,119 B2 * 1/2021 Ramachandra Iyer ..................... G06F 16/90332
2016/0232222 A1 * 8/2016 McCloskey ........... G06F 16/951
(Continued)

FOREIGN PATENT DOCUMENTS

EP     3229157 A1     10/2017
WO   2017216137 A1   12/2017

OTHER PUBLICATIONS

Berndt, et al., "A Case Study of Data Quality in Text Mining Clinical Progress Notes", ACM Transactions on Management Information System, vol. 6, No. 1, Article 1, Feb. 2015, pp. 1-21.
(Continued)

*Primary Examiner* — Leonard Saint Cyr (57) ABSTRACT

A system for automated question answering, comprising: a user interface configured to receive a query from a user; a question decomposition engine configured to decompose the query into one or more sub-questions and one or more contexts, and to align the sub-questions with contexts to generate question-context pairs; a query engine configured to query one or more answer resources with the question-context pairs to identify information likely to comprise an answer; and an answer generator configured to: (i) generate question-context-answer triples using the identified information from the query engine; (ii) select a generated question-context-answer triple comprising information most likely to comprise an answer to the identified sub-question; (iii) extract from the selected question-context-answer triple a portion of the associated information comprising an answer to the identified sub-question; and (iv) generate a natural language answer comprising a response to the query posed by the user.

11 Claims, 4 Drawing Sheets

(51) Int. Cl.
*G06N 3/08* (2006.01)
*G09B 7/00* (2006.01)
*G06F 40/289* (2020.01)

(56) References Cited

U.S. PATENT DOCUMENTS

| | | | |
|---|---|---|---|
| 2016/0283581 A1* | 9/2016 | Berajawala | G06F 16/3344 |
| 2017/0060844 A1 | 3/2017 | He et al. | |
| 2017/0337479 A1 | 11/2017 | Trischler et al. | |
| 2019/0065583 A1* | 2/2019 | Bull | G06F 16/3334 |
| 2019/0163838 A1* | 5/2019 | Ramachandra Iyer | |
| | | | G06N 20/00 |

OTHER PUBLICATIONS

Zhou, et al., "Recurrent convolutional neural network for answer selection in community question answering", Neurocomputing 274 (2018), pp. 8-18.

* cited by examiner

OPEN DOMAIN REAL-TIME QUESTION ANSWERING

CROSS-REFERENCE TO RELATED APPLICATION

The present application claims priority to and the benefit of U.S. Provisional Application Ser. No. 62/681,123, filed Jun. 6, 2018, which is hereby incorporated by reference herein.

FIELD OF THE DISCLOSURE

The present disclosure is directed generally to automated question answering methods and systems that can provide answers to open-domain questions in real-time.

BACKGROUND

People are increasingly posing questions to automated systems designed to provide answers. Typically, the questions people ask are subjective and have inherent biases, preferences, and other complexities that make providing an accurate automated answer challenging.

Automatic Question Answering (QA) is a popular area of research in natural language processing. It is typically a complex computational task which involves several components such as question understanding, question focus identification, and answer generation. Typically, the questions people ask are subjective and have inherent biases, preferences, emotions, and other complexities that make providing an accurate automated answer challenging. In addition to issues related to identifying the subjectivity, emotion, and focus of a question, QA systems must provide an answer in real-time, often in less than a minute. The generated answer must also be human-like, which means that in addition to being correct, it must be structured like a normal human response and must be grammatically correct. It is also desirable that the provided answer be concise.

Existing QA systems are mostly focused on answering knowledge driven, factoid based questions which are focused, less ambiguous, and event driven which usually have a phrase for an answer. Factoid based questions are not as strongly influenced by human subjectivity and opinions, and are thus easier to answer. These existing QA systems typically do not understand the focus of the question involved, and do not comprehend or evaluate any emotional or subjective component of the question. Accordingly, existing QA systems are unable to provide information aligned with the questioner's focus, emotion, or subjectivity.

For questions that are placed in a larger context where the context encodes the environment or the current state of the question and an answer to this question is dependent on understanding the question in that context, the current models do not scale. This becomes a more challenging task when the questions are related to opinions and experiences.

SUMMARY OF THE DISCLOSURE

There is a continued need for automated question answering systems and methods that can provide answers to open-domain questions across a multitude of topics in real-time. The present disclosure is directed to inventive methods and systems for automated question answering. Various embodiments and implementations herein are directed to a system that decomposes a user question into sub-questions and contexts. The system aligns the sub-questions and contexts to generate question-context pairs which are utilized to query answer resources in parallel. Information resulting from the queries is used to generate one or more question-context-answer triples for each sub-question, and the system selects the question-context-answer triple most likely to comprise an answer to the identified sub-question. Portions of the identified information containing an answer are extracted and a natural language answer comprising a response to the query posed by the user is generated and then provided to the user.

Generally, in one aspect, a system for automated question answering is provided. The system includes: a user interface configured to receive a query from a user, the query comprising one or more sub-questions and one or more contexts; a question decomposition engine configured to decompose the received query into one or more identified sub-questions, to decompose the received query into one or more identified contexts, and to align each of the one or more of the identified sub-questions with at least one of the one or more identified contexts to generate a plurality of question-context pairs; a query engine configured to query one or more answer resources with each of the question-context pairs to identify information likely to comprise an answer to the queried question-context pair, wherein the query engine is configured to query the question-context pairs in parallel; and an answer generator configured to: (i) generate, for each of the queried question-context pairs, one or more question-context-answer triples using the identified information from the query engine; (ii) select, for each identified sub-question, a generated question-context-answer triple comprising information most likely to comprise an answer to the identified sub-question; (iii) extract from the selected question-context-answer triple for each identified sub-question using a trained model, a portion of the associated information comprising an answer to the identified sub-question; and (iv) generate, from the extracted portions, a natural language answer comprising a response to the query posed by the user; where the user interface is further configured to provide the generated answer to the user.

According to an embodiment, the system further includes a user priority database comprising one or more user-defined answer priorities, wherein the generated response is subject to the one or more user-defined answer priorities.

According to an embodiment, the one or more user-defined answer priorities comprises a prioritization of the one or more answer resources, a threshold for a length of the natural language answer, and/or a content filter.

According to an embodiment, the answer generator comprises a neural network configured to select a generated question-context-answer triple comprising information most likely to comprise an answer to the identified sub-question.

According to an embodiment, the query engine is configured to query a plurality of answer resources for each of the question-context pairs.

Generally, in one aspect, is a method for providing a response in real-time to a query posed by a user to an automated query answering system comprising a user interface and a processor. The method includes: (i) receiving, via the user interface, the query from the user, wherein the query comprises one or more sub-questions and one or more contexts; (ii) decomposing the received query into one or more identified sub-questions; (iii) decomposing the received query into one or more identified contexts; (iv) aligning each of the one or more of the identified sub-questions with at least one of the one or more identified contexts to generate a plurality of question-context pairs; (v) querying one or more answer resources with the question-context pairs to identify information likely to comprise an answer to the queried question-context pair, wherein the query engine is configured to query the question-context pairs in parallel; (vi) generating, for each of the queried question-context pairs, one or more question-context-answer triples using the identified information; (vii) selecting, for each identified sub-question, a generated question-context-answer triple comprising information most likely to comprise an answer to the identified sub-question; (viii) extracting from the selected question-context-answer triple for each identified sub-question using a trained model, a portion of the associated information comprising an answer to the identified sub-question; (ix) generating, from the extracted portions, a natural language answer comprising a response to the query posed by the user, wherein the generated response is subject to one or more user-defined answer priorities; and (x) providing the response to the user via the user interface.

According to an embodiment, the method further includes identifying one or more answer resources.

According to an embodiment, the method further includes receiving one or more user-defined answer priorities.

According to an embodiment, selection of a generated question-context-answer triple is based at least in part on keyword overlap and/or question focus.

According to an embodiment, extracting further comprises removing duplicate information from the selected question-context-answer triples.

According to an embodiment, a plurality of answer resources are queried for a question-content pair.

According to an embodiment, a question-context pair is queried against a plurality of answer resources asynchronously.

According to an embodiment, the natural language answer is generated from the extracted portions by aligning the extracted portions in an order reflecting an order of the one or more identified sub-questions in the query.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the disclosure will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of an automated question answering system. More generally, Applicant has recognized and appreciated that it would be beneficial to provide a system that provides human-like responses to open-domain questions in real-time. The automated question answering system receives a user question and extracts sub-questions and contexts. The extracted sub-questions and contexts are aligned into question-context pairs which are queried against answer resources in parallel. Information resulting from the queries is used to generate one or more question-context-answer triples for each sub-question, and the system selects the question-context-answer triple most likely to comprise an answer to the identified sub-question. Portions of the identified information containing an answer are extracted and a natural language answer comprising a response to the query posed by the user is generated and then provided to the user.

Open-domain questions can be from any domain and can include both fact-based and non-fact-based questions. Especially for non-fact-based questions, which may involve emotions and/or opinions, it is important to understand the context in which the question is being asked to facilitate understand the inclination and/or bias of the question. Open-domain questions can be complex involving multiple sub-questions and multiple domains, and can have several interacting components with the context. Answering open-domain questions using information retrieval paradigms has numerous challenges including data sparsity, answer identification, answer generation, and scalability. The methods and systems described or otherwise envisioned herein address these issues to provide answers to open-domain questions in real-time.

Figure 1:
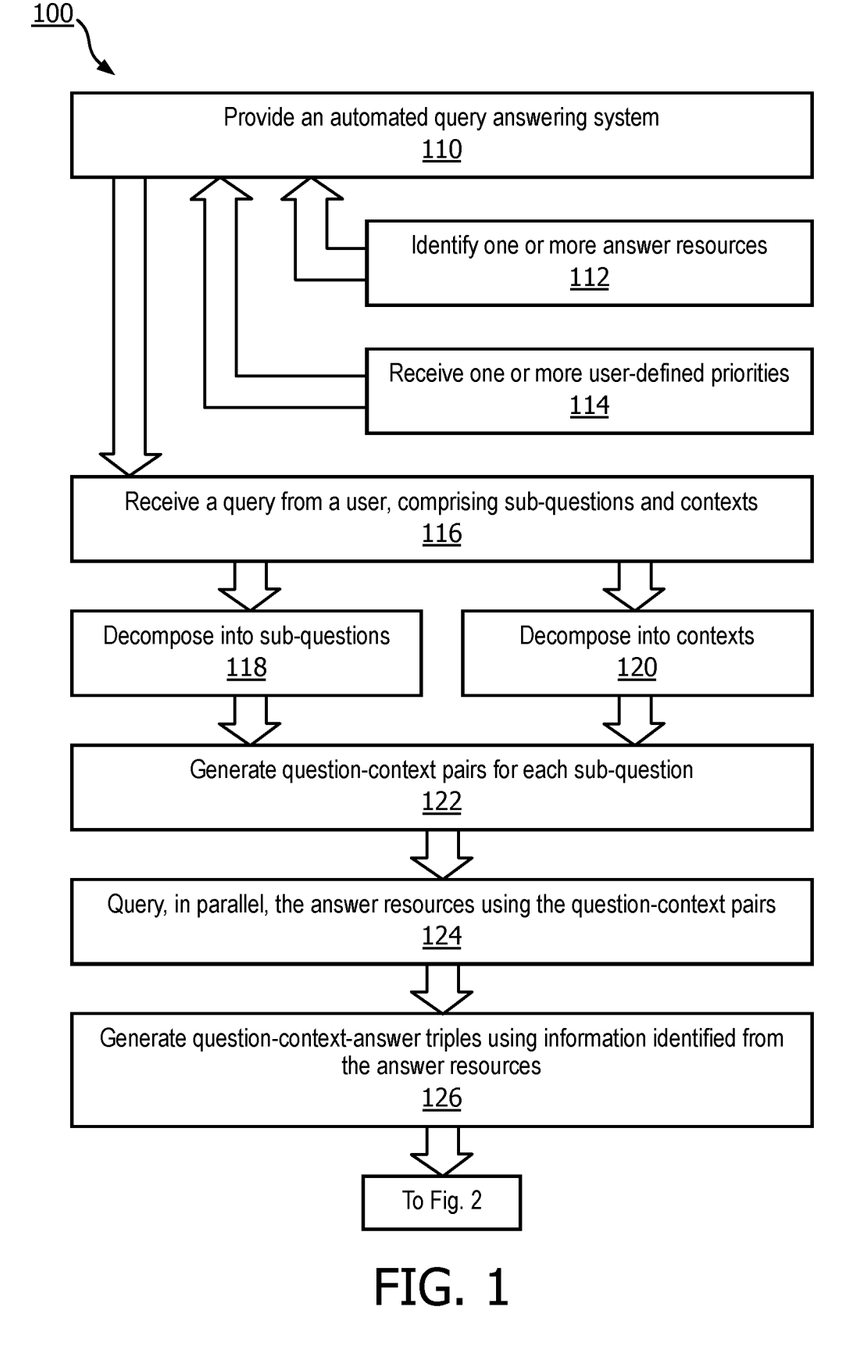
FIG. 1 is a flowchart of a method for automated question answering, in accordance with an embodiment.
Figure 2:
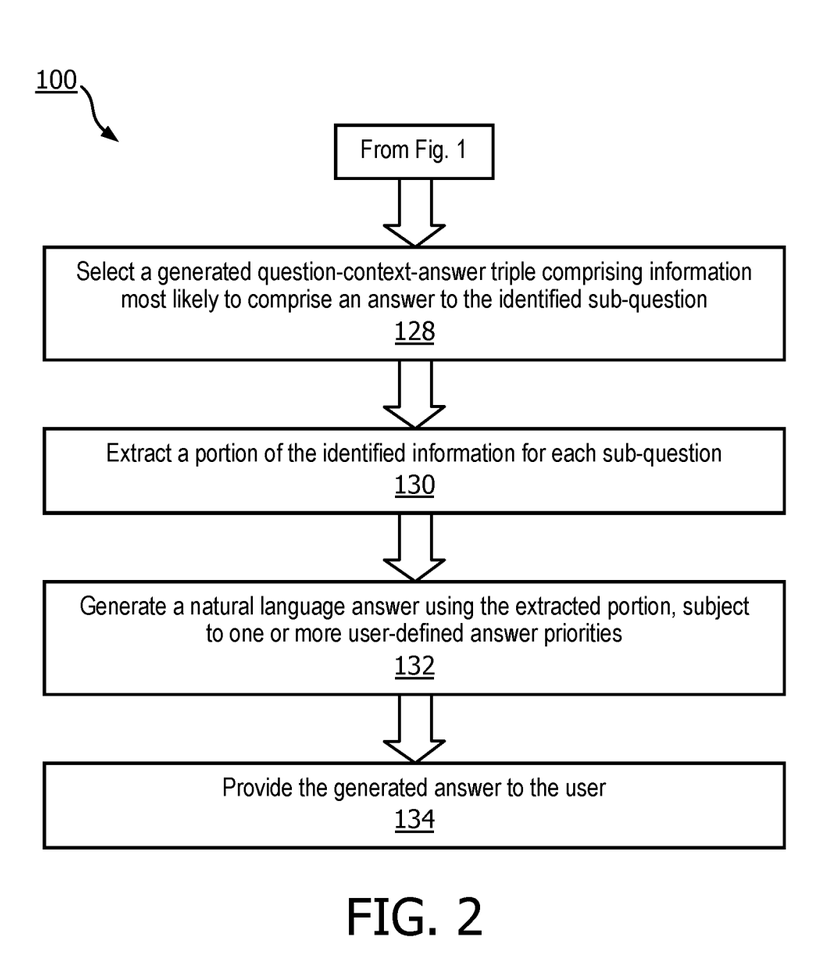
FIG. 2 is a flowchart of a method for automated question answering, in accordance with an embodiment.

Referring to FIG. 1, in one embodiment, is a flowchart of a method 100 for an automated question answering system. At step 110 of the method, an automated question answering system is provided. The automated question answering system may be any of the systems described or otherwise envisioned herein.

At step 112 of the method, one or more answer resources are identified or characterized. An answer resource may be any resource, database, or other information source which is capable of providing information at least partially responsive to a query. Examples of answer resources including search engines, wikis, information databases, online resources, offline resources, digital documents, video, recordings, and/or any other sources of information. As just a few examples, the answer resources may include Google®, Yahoo®, Wikipedia®, PubMed®, the Internet Archive, and many, many other resources. According to an embodiment, the answer resources may include, for example, the Yahoo® 4.4 million question answer corpus or any other question/answer collection.

Answer resource identification may be automated or manual. For example, a system may be configured or programmed to build a database or catalog of answer resources using a variety of mechanisms including automated and/or curated online research. The system may be designed to accept manual identification of answer resources during creation of the system, installation of the system, and/or use of the system. Additionally, as described or otherwise envisioned herein, the system may be designed to consider user preferences or priorities when identifying or characterizing an answer resource.

At step 114 of the method, the system optionally receives one or more user-defined priorities. These user-defined priorities may be manually provided via a user interface, programmed into the system, and/or learned by the system based on one or more interactions with a user or a plurality of users. To receive user-defined priorities manually or to derive them from user input, the system may present a user with one or more questions designed to elicit information indicative of a priority. For example, the user may rank or otherwise prioritize answer resources. The user may designate a preferred length or verbosity of answers provided by the system. The user may set one or more content filters designed to filter unwanted or undesirable content from a provided answer. The user may designate a confidence threshold for identified answers, or a threshold for subjectivity and/or objectivity of identified answers. These and many other user preferences or priorities are possible.

According to an embodiment, the user-defined priorities are consulted at any one of the steps of the method. For example, the user-defined priorities may influence question decomposition, the formation of question-context pairs, the search of answer resources, the generation of question-context-answer triples, and the formation of a natural language answer to the query, among other steps of the method.

At step 116 of the method, a query is received from a user. The question may be received using any method or system, or any source. For example, the question may be received from a user in real-time, such as from a mobile device, laptop, desktop, wearable device, home computing device, or any other computing device. The question may be received from any user interface that allows information to be received, such as a microphone or text input, among many other types of user interfaces. Alternatively, the question may be received from a computing device or an automated system. For example, a user's smartphone may be programmed to query the system about topics related to the user's actions, movements, location, or other aspects.

The question may be about any topic. For example, questions may include: "Should I sell my house?", "Where is the best place for me to work?", "Where is my car parked?", "Why should I invest in my retirement?" among many, many other types, forms, and variations of questions. The question may be very narrow and fact-specific with a known and constant answer ("Why is the sky blue?"), or may be broad and open-ended with a possibly unknown and inconstant answer ("Can my house be haunted?").

The question may be received directly by the automated question answering system, or may be received remotely and transmitted or otherwise communicated to the system. For example, the automated question answering system may comprise a user interface that receives questions directly. Alternatively, the automated question answering system may comprise a communications module that receives questions from any wired and/or wireless network, such as an intranet or the internet.

At step 118 of the method, a question processing or question decomposition engine analyzes the received question to identify one or more sub-questions contained within the received query. Any method for question analysis or decomposition may be utilized to identify sub-questions from the query. For example, the question decomposition engine may identify and/or extract text from the received question (such as converting an audio file to text), segment the sentence, identify one or more keywords, one or more sentiments, one or more verb relations, and/or one or more focus words. The question decomposition engine may also optionally clean or otherwise simplify the question by removing noisy characters or words, converting the question from informal social media language or slang to more traditional formats or structures, and other methods of modifying the question to improve answer generation. According to an embodiment, the question decomposition engine may utilize a classifier, a neural network, and/or any other method of analysis and/or decomposition.

At step 120 of the method, which may be performed simultaneously with step 118 of the method, the question processing or question decomposition engine analyzes the received question to identify one or more contexts. According to an embodiment, the context may comprise information about the user, the environment, a current state of the question, a current state of the system, a user preference, an emotion, a location, a state of being, and/or any other contextual information extractable from the user's query.

At step 122 of the method, each of the identified sub-questions is aligned with at least one of the identified contexts to generate a plurality of question-context pairs. For example, the sub-questions and/or context can be compared or otherwise aligned to identify a correspondence between a sub-question and a context. Alternatively, identified contexts can be associated with each sub-question. Many methods for aligning an identified sub-question and an identified context are possible.

At step 124 of the method, one or more of the answer resources are queried, asynchronously and/or in parallel, with the question-context pairs to identify information likely to comprise an answer to the queried question-context pair. For example, the system may comprise an asynchronous call generator which functions as a query engine to direct queries to the answer resources in an asynchronous manner. Several queries can be directed at any one time, and thus the system is highly scalable due to parallel queries. A question-context pair can be used to search one answer resource, or can be used to search two or more answer resources. For example, a question-context pair can be used to query answer resources such as Google, Yahoo, and/or Wikipedia, and may be queried against these answer resources in parallel.

At step 126 of the method, the system generates a question-context-answer triple for a question-context pair using the information identified in the querying of step 124 of the method. For example, the query may identify potentially answering information to a question-context pair from a search engine result list and from a medical database. The system generates a question-context-answer triple from the search engine result list information and a question-context-answer triple from the medical database information. According to an embodiment, these question-context-answer triples are the basis for generating an answer to the user's query.

At step 128 of the method the system selects, for each sub-question, a generated question-context-answer triple comprising information most likely to comprise an answer to the identified sub-question. This selection may be based on a variety of different mechanisms. For example, the system may select a question-context-answer triple by comparing each triple to the sub-question. According to an embodiment, the system utilizes keyword overlap and/or question focus, including information from the context or other analysis of the question, to select a question-context-answer triple. According to an embodiment, the system identifies a triple which has the same meaning and focus as the target question but is asked in a different way. According to an embodiment, the system utilizes a neural network or system such as neural paraphrasing to select a question-context-answer triple that is most likely to comprise an answer to the identified sub-question.

At step 130 of the method the system extracts, from the selected question-context-answer triple, a portion of the associated information comprising an answer to the identified sub-question. For example, the system extracts the portion of the information in the question-context-answer triple which comprises or is most likely to comprise the answer to the sub-question. The system may also remove duplicate information from the associated information and/or from the question-context-answer triples.

There are many methods for extraction of the portion of the associated information. According to an embodiment, the portion of the answer that best satisfies the target sub-question is extracted using a bi-directional attentional model which is trained on a set of questions. The set of questions may comprise, for example, a large body of text with questions and associated answers. For example, the model may learn how to identify the important and/or most relevant pieces in view of the question and the possibly answering text. For example, for a "who" question the model learns that the answer must be a person or an organization and primes for filling the slot that satisfies the "who" question with a person/organization. Given a question and probable answer to a very similar question, the model can pick the most important part of the answer that satisfies the original question. This can be repeated until there is an answer, an extracted piece of information, for each of the identified sub-questions. According to an embodiment, this asynchronous manner of generating answers to the sub-questions makes the system scalable and vastly improves the answering of complex open-domain questions.

At step 132 of the method the system generates, from the extracted information for each of the identified sub-questions, a natural language answer comprising a response to the query posed by the user. For example, after identifying the best answer for each sub-question, the system generates a summarization of the answer bringing in the answers to each sub-question. According to an embodiment, the natural language answer is generated from the extracted portions by aligning the extracted portions in an order reflecting an order of the one or more identified sub-questions in the query. Thus, the system may organize these answers to reflect the question from the user. For example, the answers may be organized, ordered, or otherwise structures to reflect an organization or order of the query and/or the sub-questions. For example, the answer to the first sub-question in the query may be first in an answer, and the answer to the second sub-question in the query may be second in the answer, and so on. The system may optionally remove duplicate information or answers while generating the natural language answer.

According to an embodiment, the generated response is subject to one or more user-defined answer priorities which may be enforced or influential at any step of the method. For example, the system may comprise a monitor or other mechanism for checking user-defined priorities against input and/or output of any step of the method. For example, an asynchronous monitor may comprise several services which are summoned when required, such as when the answer is ready, to monitor if the answer is satisfying requirements set by the user. The one or more user-defined priorities may comprise a prioritization of the one or more answer resources, a threshold for a length of the natural language answer, and/or a content filter, among many other possible settings, thresholds, or priorities as described or otherwise envisioned herein.

At step 134 of the method, the response is provided to the user. The answer can be provided to the user via any user interface that allows information to be conveyed, such as a speaker or screen, among many other types of user interfaces. Alternatively, the answer may be provided from a computing device or an automated system. For example, a user's smartphone may be programmed to automatically query the system about topics related to the user's actions, movements, location, or other aspects, and will automatically receive the answer to provide to the user as needed, on-demand, or otherwise.

According to an embodiment, the final answer is provided to the user in 60 seconds or less, 30 seconds or less, 10 seconds or less, or any a larger or smaller timeframe. This timeframe may be predetermined or may be based on one or more user settings, machine-learned parameters, or any other parameters. For example, the user may specify a timeframe via a user interface or a user setting. This user-specified timeframe may affect one or more steps of the method described herein, such as limiting the amount of processing performed at one or more of the steps.

Figure 3:
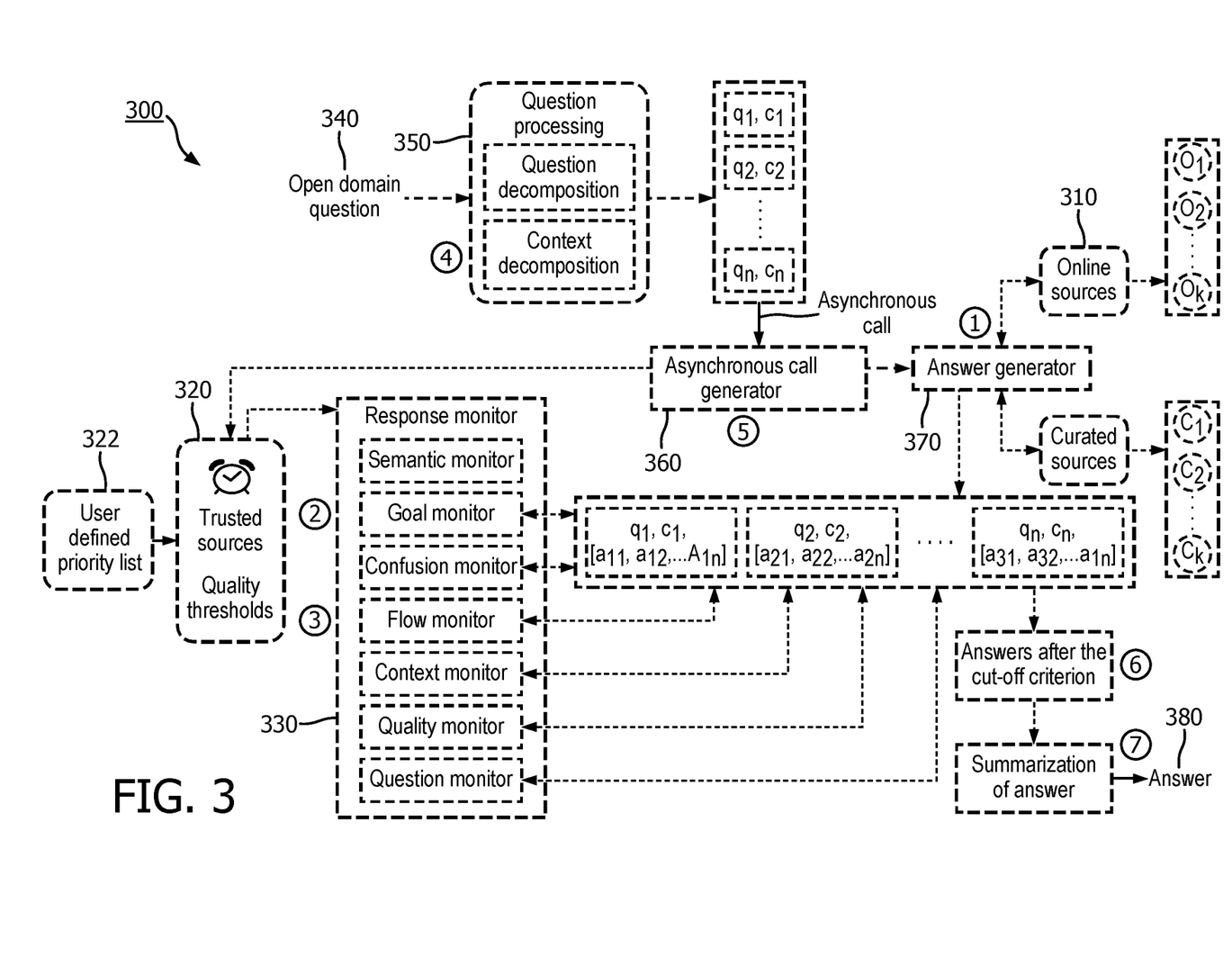
FIG. 3 is a flowchart of a method and system for automated question answering, in accordance with an embodiment.

Referring to FIG. 3 is a flowchart of a method and system 300 for automated question answering. The automated question answering method and system 300 may be any of the automated question answering methods or systems described or otherwise envisioned herein. According to an embodiment, system 300 may comprise one or more answer resources 310, which may be any resource, database, or other information source which is capable of providing information at least partially responsive to a query. For example, the answer resources 310 may comprise online sources, curated sources, and many other sources.

System 300 may also comprise a database 320 of one or more user-defined priorities 322. These user-defined priorities may be manually provided via a user interface, programmed into the system, and/or learned by the system based on one or more interactions with a user or a plurality of users. The system may also comprise a response monitor 330 which monitors or checks user-defined priorities against input and/or output of any step of the method. For example, response monitor 330 may comprise several services which are summoned when required, such as when the answer is ready, to monitor if the answer is satisfying requirements set by the user. Services include a semantic monitor, a goal monitor, a confusion monitor, a flow monitor, a context monitor, a quality monitor, a question monitor, and/or any other monitors. These monitors may be influenced or determined by one or more user-defined priorities 322. The one or more user-defined priorities 322 and the response monitor 330 may be called, or may effect an influence, at any step of the method.

System 300 may receive a question, such as an open-domain question, from the user via a user interface or other input 340. The question may be received using any method or system, or any source. For example, the question may be received from a user in real-time, such as from a mobile device, laptop, desktop, wearable device, home computing device, or any other computing device. The question may be received from any user interface that allows information to be received, such as a microphone or text input, among many other types of user interfaces. The question may be received directly by the automated question answering system, or may be received remotely and transmitted or otherwise communicated to the system.

System 300 may also comprise a question processing or question decomposition engine 350 which analyzes the received question to identify one or more sub-questions contained within the received query. Any method for question analysis or decomposition may be utilized to identify sub-questions from the query. The question processing or question decomposition engine 350 also analyzes the received question to identify one or more identify one or more contexts. According to an embodiment, the context may comprise information about the user, the environment, a current state of the question, a current state of the system, a user preference, an emotion, a location, a state of being, and/or any other contextual information extractable from the user's query.

The question processing or question decomposition engine 350 also aligns each of the identified sub-questions with at least one of the identified contexts to generate a plurality of question-context pairs. For example, the sub-questions and/or context can be compared or otherwise aligned to identify a correspondence between a sub-question and a context. Alternatively, identified contexts can be associated with each sub-question. Many methods for aligning an identified sub-question and an identified context are possible.

System 300 comprises an asynchronous call generator 360 which is configured or designed to query the one or more answer resources 310 using the plurality of question-context pairs, preferably asynchronously and in parallel. Since several queries can be directed at any one time, the system is highly scalable. A question-context pair can be used to search one answer resource, or can be used to search two or more answer resources. For example, a question-context pair can be used to query answer resources such as Google, Yahoo, and/or Wikipedia, and may be queried against these answer resources in parallel.

System 300 comprises an answer generator 370 which is configured or designed to generate an answer using the output of queries using the question-context pairs. According to an embodiment, the answer generator 370 generates a question-context-answer triple for a question-context pair using the information identified by querying the answer resources. For example, the query may identify potentially answering information to a question-context pair from a search engine result list and from a medical database. The system generates a question-context-answer triple from the search engine result list information and a question-context-answer triple from the medical database information.

The answer generator 370 selects, for each sub-question, a generated question-context-answer triple comprising information most likely to comprise an answer to the identified sub-question. This selection may be based on a variety of different mechanisms. For example, the system may select a question-context-answer triple by comparing each triple to the sub-question.

The answer generator 370 extracts, from the selected question-context-answer triple, a portion of the associated information comprising an answer to the identified sub-question. For example, the system extracts the portion of the information in the question-context-answer triple which comprises or is most likely to comprise the answer to the sub-question.

The answer generator 370 generates, from the extracted information for each of the identified sub-questions, a natural language answer comprising a response to the query posed by the user. For example, after identifying the best answer for each sub-question, the system generates a summarization of the answer bringing in the answers to each sub-question. According to an embodiment, the natural language answer is generated from the extracted portions by aligning the extracted portions in an order reflecting an order of the one or more identified sub-questions in the query.

According to an embodiment, as described or otherwise envisioned herein, the answer generator 370 may be subject to one or more user-defined answer priorities 322 in the database 320.

System 300 may comprise a user interface or other output mechanism 380 to provide the answer to the user. Notably, user interface 380 may be the same as user interface 340, or they may be separate input and/or output mechanisms or devices. The answer can be provided to the user via any user interface that allows information to be conveyed, such as a speaker or screen, among many other types of user interfaces. Alternatively, the answer may be provided from a computing device or an automated system. For example, a user's smartphone may be programmed to automatically query the system about topics related to the user's actions, movements, location, or other aspects, and will automatically receive the answer to provide to the user as needed, on-demand, or otherwise.

Figure 4:
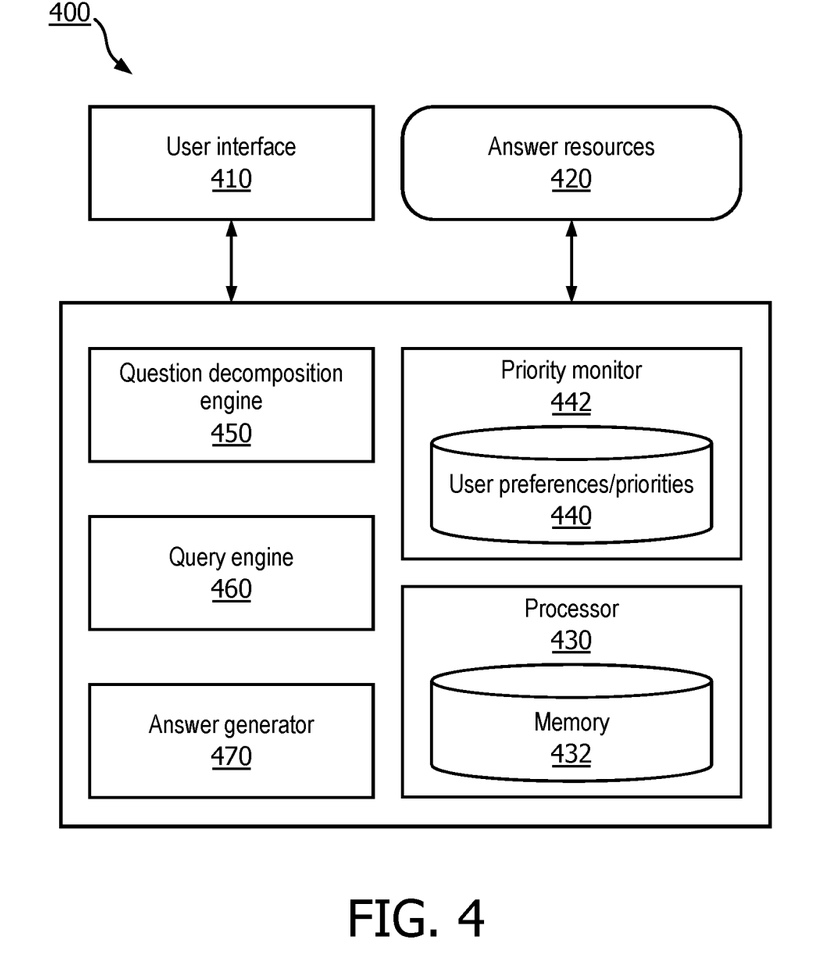
FIG. 4 is a schematic representation of a system for automated question answering, in accordance with an embodiment.

Referring to FIG. 4, in one embodiment, is a schematic representation of a system 400 for automated question answering. System 400 can comprise any of the elements, engines, database, processors, and/or other components described or otherwise envisioned herein. According to an embodiment, system 400 comprises a user interface 410 to receive a question and/or provide an answer. The user interface can be any device or system that allows information to be conveyed and/or received, such as a speaker or screen, among many other types of user interfaces. The information may also be conveyed to and/or received from a computing device or an automated system. The user interface may be located with one or more other components of the system, or may located remote from the system and in communication via a wired and/or wireless communications network.

According to an embodiment, system 400 comprises or is in communication with one or more answer resources 420. An answer resource may be any resource, database, or other information source which is capable of providing information at least partially responsive to a query. Examples of answer resources including search engines, wikis, information databases, online resources, offline resources, digital documents, video, recordings, and/or any other sources of information. The answer resources can be stored in a local or database, which may be located with one or more other components of the system, or may be located remote from the system and in communication via a wired and/or wireless communications network.

According to an embodiment, system 400 comprises a processor 430 which performs one or more steps of the method, and may comprise one or more of the engines or generators. Processor 430 may be formed of one or multiple modules, and can comprise, for example, a memory 432. Processor 430 may take any suitable form, including but not limited to a microcontroller, multiple microcontrollers, circuitry, a single processor, or plural processors. Memory 432 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by the processor, controls operation of one or more components of system 400.

According to an embodiment, system 400 comprises a database 440 of one or more user-defined priorities. These user-defined priorities may be manually provided via a user interface, programmed into the system, and/or learned by the system based on one or more interactions with a user or a plurality of users. The system may also comprise a priority or response monitor 442 which is configured or designed to monitor or check user-defined priorities from database 440 against input and/or output of any step of the method.

According to an embodiment, system 400 comprises a question decomposition engine 450 which analyzes the received question to identify one or more sub-questions contained within the received query. Any method for question analysis or decomposition may be utilized to identify sub-questions from the query. The question decomposition engine 450 also analyzes the received question to identify one or more identify one or more contexts. According to an embodiment, the context may comprise information about the user, the environment, a current state of the question, a current state of the system, a user preference, an emotion, a location, a state of being, and/or any other contextual information extractable from the user's query.

According to an embodiment, system 400 comprises a query engine 460 which is configured or designed to query the one or more answer resources 420 using the plurality of question-context pairs, preferably asynchronously and in parallel. Since several queries can be directed at any one time, the system is highly scalable. A question-context pair can be used to search one answer resource, or can be used to search two or more answer resources.

According to an embodiment, system 400 comprises an answer generator 470 which is configured or designed to generate an answer using the output of queries using the question-context pairs. According to an embodiment, the answer generator 470 generates a question-context-answer triple for a question-context pair using the information identified by querying the answer resources. For example, the query may identify potentially answering information to a question-context pair from a search engine result list and from a medical database. The system generates a question-context-answer triple from the search engine result list information and a question-context-answer triple from the medical database information. The answer generator 470 can, among other things, select a generated question-context-answer triple comprising information most likely to comprise an answer to the identified sub-question, extract a portion of the associated information comprising an answer to the identified sub-question, and generate a natural language answer comprising a response to the query posed by the user. The generated answer can be provided to the user via user interface 410.

According to an embodiment, the systems and methods described herein significantly improve the functionality, efficiency, and output of a computerized question answering system. Due to the asynchronous and/or parallel sub-question query and answer methodology, the system generates more accurate answers in a significantly improved timeframe, and is highly scalable. This improvement in scalability solves a long need in the field of open-domain question answering.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A system for automated question answering, the system comprising:
    a user interface configured to receive a query from a user, the query comprising one or more sub-questions and one or more contexts;
    a user priority database comprising one or more user-defined answer priorities; a question decomposition engine configured to decompose the received query into one or more identified sub-questions, to decompose the received query into one or more identified contexts, and to align each of the one or more of the identified sub-questions with at least one of the one or more identified contexts to generate a plurality of question-context pairs;
    an automated query engine configured to query one or more answer resources with each of the question-context pairs to identify information likely to comprise an answer to the queried question-context pair, wherein the query engine is configured to query the question-context pairs in parallel; and
    an answer generator configured to: (i) generate, for each of the queried question-context pairs, one or more question-context-answer triples using the identified information from the query engine; (ii) select, for each identified sub-question, a generated question-context-answer triple comprising information most likely to comprise an answer to the identified sub-question; (i11) extract from the selected question-context-answer triple for each identified sub-question using a trained model, a portion of the associated information comprising an answer to the identified sub-question; and (iv) generate, from the extracted portions, a natural language answer comprising a response to the query posed by the user, wherein the generated response is subject to the one or more user-defined answer priorities;
    wherein the user interface is further configured to provide the generated answer to the user;
    wherein the one or more user-defined answer priorities comprises a user-defined prioritization of the one or more answer resources, a user-defined threshold for a length of the natural language answer, and/or a user-defined content filter.

2. The system of claim 1, wherein the answer generator comprises a neural network configured to select a generated question-context-answer triple comprising information most likely to comprise an answer to the identified sub-question.

3. The system of claim 1, wherein the query engine is configured to query a plurality of answer resources for each of the question-context pairs.

4. A method for providing a response in real-time to a query posed by a user to an automated query answering system comprising a user interface and a processor, the method comprising:
    receiving, one or more user-defined answer priorities;
    storing the received one or more user-defined answer priorities in a user priority database of the automated query answering system;
    receiving, via the user interface, the query from the user, wherein the query comprises one or more sub-questions and one or more contexts;
    decomposing the received query into one or more identified sub-questions;
    decomposing the received query into one or more identified contexts;
    aligning each of the one or more of the identified sub-questions with at least one of the one or more identified contexts to generate a plurality of question-context pairs;
    querying one or more answer resources with the question-context pairs to identify information likely to comprise an answer to the queried question-context pair, wherein the query engine is configured to query the question-context pairs in parallel;
    generating, for each of the queried question-context pairs, one or more question-context-answer triples using the identified information;
    selecting, for each identified sub-question, a generated question-context-answer triple comprising information most likely to comprise an answer to the identified sub-question;
    extracting from the selected question-context-answer triple for each identified sub-question using a trained model, a portion of the associated information comprising an answer to the identified sub-question;

generating, from the extracted portions, a natural language answer comprising a response to the query posed by the user, wherein the generated response is subject to the stored one or more user-defined answer priorities; and providing the response to the user via the user interface;

wherein the one or more user-defined answer priorities comprises a user-defined prioritization of the one or more answer resources, a user-defined threshold for a length of the natural language answer, and/or a user-defined content filter.

5. The method of claim 4, further comprising the step of identifying one or more answer resources.

6. The method of claim 4, wherein selection of a generated question-context-answer triple is based at least in part on keyword overlap and/or question focus.

7. The method of claim 4, wherein selection of a generated question-context-answer triple is performed by a neural network.

8. The method of claim 4, wherein extracting further comprises removing duplicate information from the selected question-context-answer triples.

9. The method of claim 4, wherein a plurality of answer resources are queried for a question-content pair.

10. The method of claim 4, wherein a question-context pair is queried against a plurality of answer resources asynchronously.

11. The method of claim 4, wherein the natural language answer is generated from the extracted portions by aligning the extracted portions in an order reflecting an order of the one or more identified sub-questions in the query.

* * * * *